US006911992B2

(12) United States Patent
Bronstein et al.

(10) Patent No.: US 6,911,992 B2
(45) Date of Patent: Jun. 28, 2005

(54) POSTER PREPARATION SYSTEM AND METHOD

(75) Inventors: Kenneth H. Bronstein, Corvallis, OR (US); Diane R. Hammerstad, Corvallis, OR (US); Arne D. Thormodsen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 10/273,878

(22) Filed: Oct. 18, 2002

(65) Prior Publication Data

US 2004/0075669 A1 Apr. 22, 2004

(51) Int. Cl.[7] .......................... G09G 5/00; G06F 15/00; G06K 1/00
(52) U.S. Cl. ...................................... 345/629; 358/1.18
(58) Field of Search ................................ 345/619, 629; 700/235; 358/1.1, 1.18

(56) References Cited

U.S. PATENT DOCUMENTS

| | | | | |
|---|---|---|---|---|
| 5,933,546 | A | * | 8/1999 | Stone .......................... 382/278 |
| 6,195,101 | B1 | * | 2/2001 | Ghislain Bossut et al. . 345/629 |
| 6,665,587 | B2 | * | 12/2003 | Leone et al. ................. 700/235 |
| 6,819,442 | B2 | * | 11/2004 | Takahashi .................. 358/1.15 |
| 2003/0052897 | A1 | * | 3/2003 | Lin ............................. 345/619 |
| 2003/0142325 | A1 | * | 7/2003 | Leslie ......................... 358/1.1 |
| 2003/0206316 | A1 | * | 11/2003 | Anderson et al. .......... 358/1.18 |

OTHER PUBLICATIONS

About LView Poster, [online], [retrieved on Jun. 12, 2001] Retrieved using Internet URL: http://www.lview.com/K_AboutLViewPoster.htm.

LView Pro What's New, [online], [retrieved on Jun. 12, 2001] Retrieved using Internet URL: http://www.lview.com/K_What'sNewInLViewPro.htm.

LView Pro Main Features, [online], [retrieved on Jun. 12, 2001] Retrieved using Internet URL: http://www.lview.com/K_MainFeatures.htm.

Cypher—Poster printing—artwork preparation, [online], [retrieved on Jun. 13, 2001] Retrieved using Internet URL: http:www.//cypherweb.co.uk/posters_guidelines.htm.

Cypher—Poster printing, mounting & laminating, [online], [retrieved on Jun. 13, 2001] Retrieved using Internet URL: http://www.cypherweb.co.uk/posters.htm.

Big Poster printing Services, [online], [retrieved on Jun. 13, 2001] Retrieved using Internet URL: http://www.homepage.com.hk/poster.html.

PrintUSA, [online], [retrieved on Jun. 13, 2001] Retrieved using Internet URL: http://www.printusa.com.

iPtintPosters, [online], [retrieved Jun. 13, 2001] Retrieved using Internet URL: http://www.iprintposters.com/.

* cited by examiner

Primary Examiner—Matthew C. Bella
Assistant Examiner—Aaron M. Richer (57) ABSTRACT

A poster generation system and method includes interaction between a publishing server and a client, for example including interaction via a global computer network, to generate a poster. The publishing server provides interfaces to allow a user of the client, via the network, to select a poster template, populate the template with multiple images to be incorporated into the poster, manipulate the images within copy holes of the poster, and request a preview image of at least part of the poster. The publishing server is able to generate the preview image and forward it to the client via the network.

21 Claims, 6 Drawing Sheets

POSTER PREPARATION SYSTEM AND METHOD

RELATED APPLICATION

This application is related to concurrently-filed, commonly-assigned application Ser. No. 10/273.877, entitled "Poster Preparation System and Method", which is hereby incorporated by reference in its entirety.

BACKGROUND ART

Printing services have long provided a means of enlarging photographs and printing them as posters. With the advent of the Internet, conventional enlargement of photographs and printing of posters has become an electronic business through the use of a global collection of computer networks and gateways that allow communication between computers via high-speed data communication lines between major nodes or host computers. Web sites for electronic poster-producing businesses may be accessed on the World Wide Web ("the Web"), via conventional software and hardware such as a Web browser, in order to obtain information regarding sizes and prices of posters. Image files may then be submitted to the electronic poster producer via electronic mail or via computer-readable media sent by ordinary post.

It will be appreciated that prior electronic poster-producing processes such as those described above are limited in their flexibility and make only limited use of the potential of a global computer network such as the Internet.

BRIEF DESCRIPTION OF THE DRAWINGS

The invention may be understood with reference to the following drawings, which are not necessarily to scale. Also, in the drawings, like reference numerals designate corresponding parts throughout the several views.

DETAILED DESCRIPTION

A poster generation system and method includes interaction between a publishing server and a client, for example including interaction via a global computer network, to generate a poster. The term "poster", as used herein, is broadly defined as a document larger in size than a standard-sized piece of media (letter, legal, or A4). The publishing server includes interfaces configured to allow the user of the client to select a poster template and to populate the poster template with images, graphics, and/or text. The term "template", as used herein, is defined as a pre-designed document format that contains preselected text and/or graphics, as well as containing one or more copy holes to receive user-selected images, graphics, and/or text.

Image data corresponding to the image files to populate the template are sent from the client to the publishing server. The image data may include electronic versions of image files and/or locators where the image files may be obtained, either on the publishing server or on other computers coupled to the publishing server via a network. The publishing server then retrieves the image files, if necessary, and may perform error checking on the image files, for example checking to see that the image files are readable and in a format that can be utilized by the publishing server and that the image files meet a minimum resolution threshold.

Another interface on the publishing server may then be used to allow the user to manipulate the images populating the template, for example rescaling the image and translating the image to allow a magnified portion of the image to appear in the copy hole of the template. The image manipulation interface may also be configured for selection of a preview image to be generated in the publishing server and downloaded to the client. The preview may be all or a part of the poster and may be printed by the user of the client in order to check a sample showing the actual resolution of the poster to determine if the resolution is acceptable to the user of the client.

Figure 1:
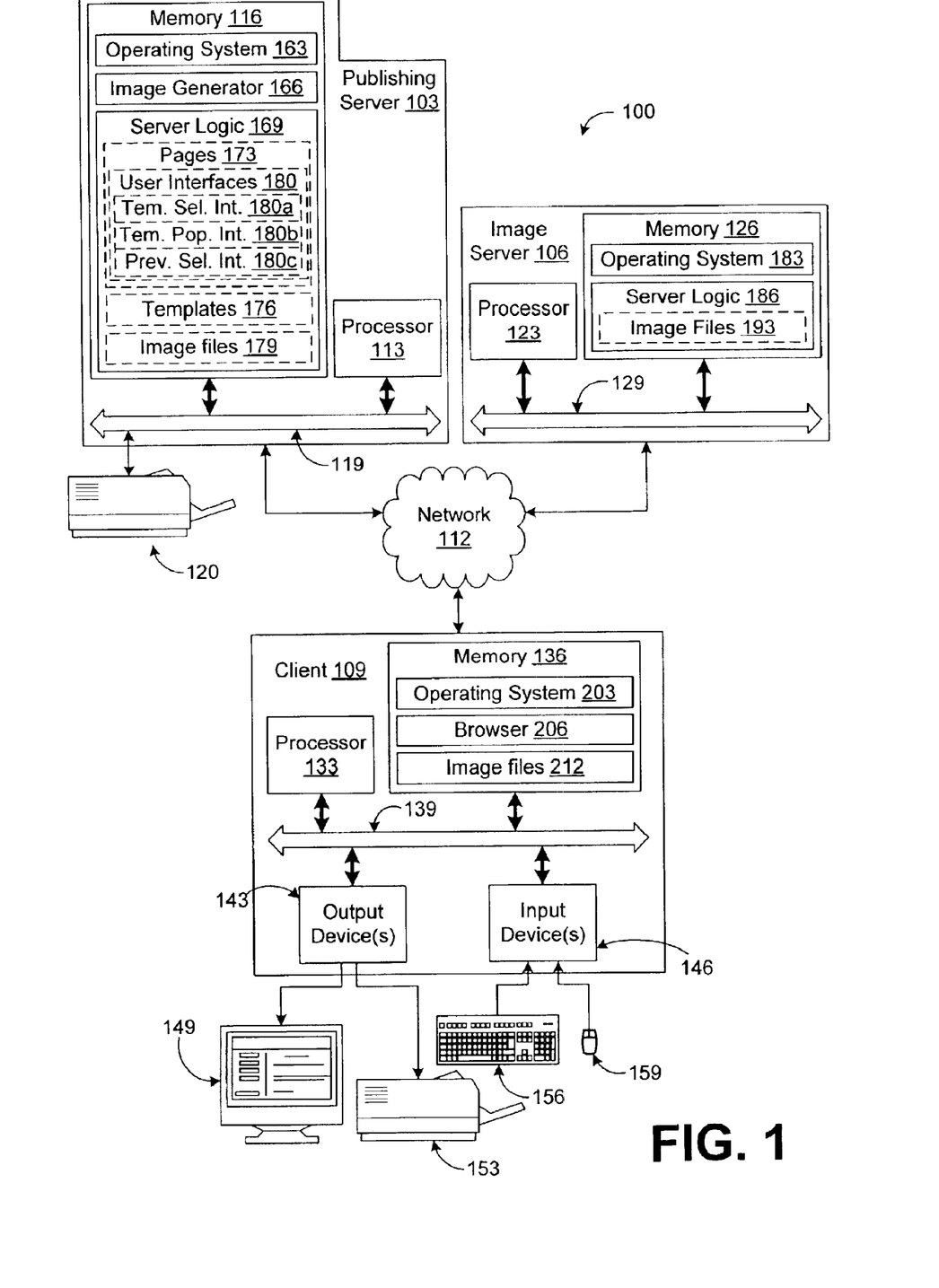
FIG. 1 is a block diagram of a poster generation system, according to an embodiment of the present invention.

Referring initially to FIG. 1, a poster generation system 100 is shown. The poster generation system 100 includes a publishing server 103, an image server 106, and a client 109, all of which are coupled to a network 112. The publishing server 103 may include, for example, a computer system or other apparatus with similar capability. In particular, the publishing server 103 includes a processor circuit with a processor 113 and a memory 116, both of which are coupled to a local interface 119. The local interface 119 may include, for example, a data bus with an accompanying control/address bus, as is generally known by those with ordinary skill in the art.

Various peripheral devices may be coupled to the local interface 119. In particular, peripheral devices may include, for example, a keyboard, keypad, touch pad, touch screen, microphone, scanner, mouse, joystick, or one or more push buttons, etc. The peripheral devices may also include display devices, indicator lights, speakers, printers, etc. Specific display devices may be, for example, cathode ray tubes (CRTs), liquid crystal display screens, gas plasma-based flat panel displays, or other types of display devices, etc. For example, the publishing server 103 may have a printer 120 attached thereto via the local interface 119.

Similarly, the image server 106 may include, for example, a computer system or other system with similar capability. In particular, the image server 106 includes a processor circuit with a processor 123 and a memory 126, both of which are coupled to a local interface 129. The local interface 129 may be, for example, a data bus with an accompanying control/address bus, as is generally known by those with ordinary skill in the art.

The client 109 may also include a computer system or other system with similar capability. The client 109 includes a processor circuit with a processor 133 and a memory 136, both of which are coupled to a local interface 139. The local interface 139 may be a data bus with an accompanying control/address bus. The client 109 also includes various output interfaces 143 and input interfaces 146 (referred to as devices in FIG. 1), through which the client 109 may be connected to various peripheral devices. Such peripheral devices may include a display device 149, a printer 153, a keyboard 156, and a mouse 159. Other peripheral devices that may be employed by the client 109 to receive various user input and/or to provide user output, include those listed above with regard to the publishing server 103.

The memories 116, 126, and 136 are defined herein as both volatile and non-volatile memory and data storage components. Volatile components are those that do not retain data values upon loss of power. Non-volatile components are those that retain data upon a loss of power. Thus, the memories 116, 126, and 136 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, each of the processors 113, 123, and 133 may represent multiple processors and each of the memories 116, 126, and 136 may represent multiple memories that operate in parallel. In such a case, the local interfaces 119, 129, and 139 may be appropriate networks that facilitate communication between any of the multiple processors, between any processor and any one of the memories, or between any two of the memories etc. The processors 113, 123, and 133 may be electrical or optical in nature.

The network 112 includes, for example, the Internet, intranets, wide area networks (WANs), local area networks (LANs), wireless networks, or other suitable networks, etc., or any combination of such networks. The publishing server 103, the image server 106, and the client 109 may be coupled to the network 112 in one of any number of ways known by those with ordinary skill in the art so as to facilitate data communication to and from the network 112. In this respect, the publishing server 103, the image server 106, and the client 109 may be linked to the network 112 through various devices such as, for example, network cards, modems, or other such communications devices, etc.

The publishing server 103 includes various software components that are stored on the memory 116 and are executable by the processor 113. These components include an operating system 163, an image generator 166, and server logic 169. The server logic 169 may include a network server and may include one or more pages 173. In addition, the server logic 169 includes one or more templates 176 and may include image files 179. Within the pages 173 are user interfaces 180 used in the poster generation process. The user interfaces include a template selection interface 18*a*, a template population interface 180*b*, and an image manipulation/selection interface 180*c*.

The image server 106 also includes various software components, which are stored on the memory 126 and are executable by the processor 123. These components include an operating system 183, as well as server logic 186 that may include image files 193. The image files 193 may be stored in any of a variety of well-known formats or forms. For example, the image files 193 may be stored in a database so as to be easily identified and retrieved when needed.

It will be appreciated that the functions of the publishing server 103 and the image server 106 may be combined in a single server or may be different servers on a single computer.

The client 109 also includes software components that are stored on the memory 136 and are executable by the processor 133. These components include an operating system 203 and a network browser 206. By manipulating the browser 206, the pages 173 may be downloaded from the publishing server 103, having been transmitted by the server logic 169, which is stored on the memory 116 of the publishing server 103. Thus, the browser 206 and the server logic 169 may operate, for example, according to the dictates of the Hypertext Transfer Protocol (HTTP) employed on the World Wide Web or other suitable protocol. In this sense, the pages 173 may be created using a markup language, such as hypertext markup language (HTML), as is generally known by those with ordinary skill in the art. Alternatively, other programming languages or formats may be employed to create the pages 173, including extensible markup language (XML) or another mark-up language, JAVA, Active Server Page Scripting (ASP), JAVASCRIPT, C++, or other suitable computer languages and/or formats. It will also be appreciated that that the pages 173 may include other types of pages and/or data files. The memory 126 also may include image files 212.

The operating systems 163, 183, and 203 are executed to control the allocation and usage of hardware resources, such as the memory, processing time and peripheral devices, in the publishing server 103, the image server 106, and the client 109, respectively. In this manner, the operating systems 163, 183, and 203 serve as the foundation on which applications depend as is generally known by those with ordinary skill in the art.

Figure 2:
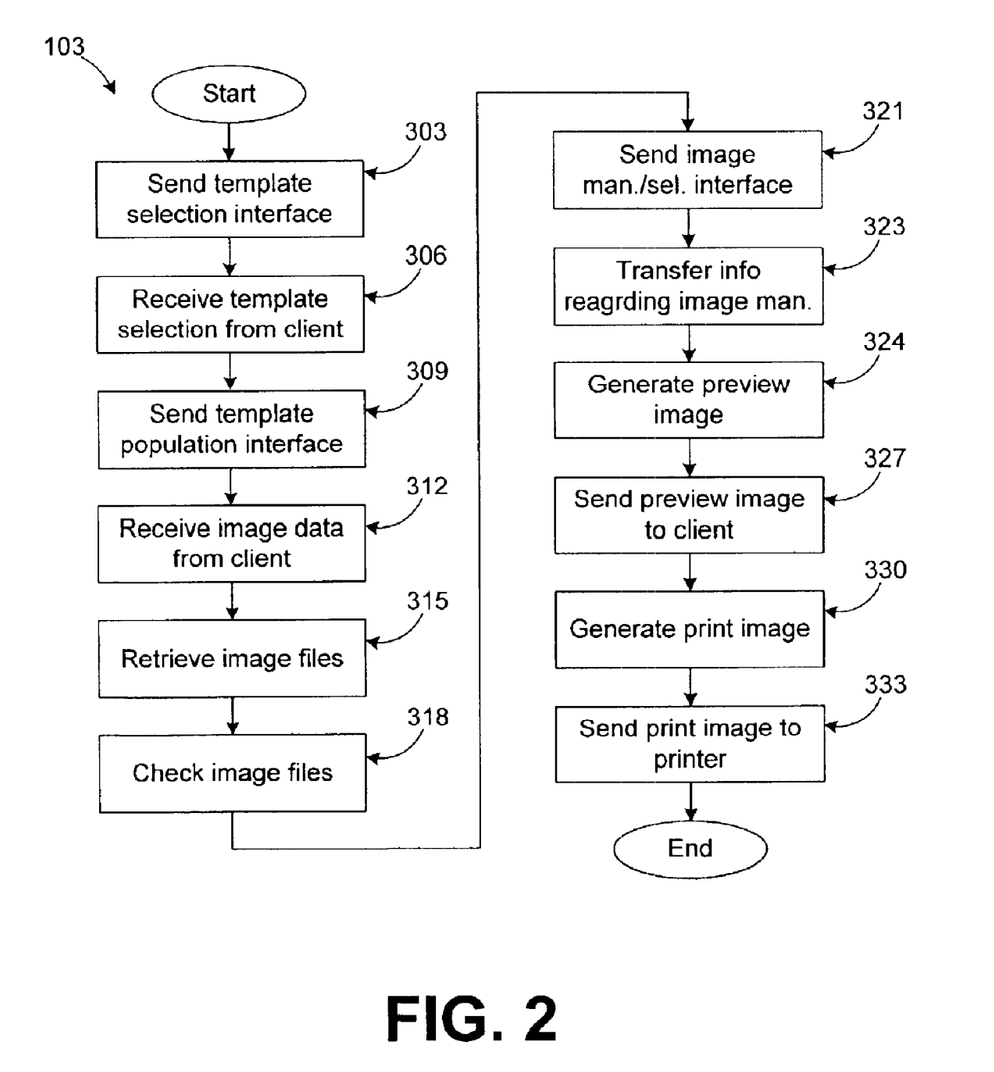
FIG. 2 is a flowchart of some of the functionality of the poster generation system of FIG. 1.

With reference now to FIG. 2, a high-level flowchart is shown, outlining the general functionality (logical function) of the poster preparation system 100 (FIG. 1). Alternatively, the flowchart of FIG. 2 may represent method steps taken in operation of the poster preparation system 100, including steps taken both in the image generator 166 (FIG. 1) of the publishing server 103 (FIG. 1), and in downloading (from the publishing server 103 to the client 109) and operation of the user interfaces 180 (FIG. 1). The user interfaces 180 may be displayed on the display 149 (FIG. 1) to allow the user of the client 109 to interactively participate in the poster generation process.

In block 303, the page 173 (FIG. 1) containing the template selection interface 180*a* (FIG. 1) is sent from the publishing server 103 to the client 109 in response to a request therefrom. The template selection interface 180*a* is configured to allow the user of the client 109 to select a template 176 (FIG. 1) for the poster, in block 306. Various templates may be selected via the template selection interface 180*a*. The templates may have any of a variety of themes (e.g., birthday, anniversary, retirement, etc); may have different numbers and configurations of image-receiving copy holes for insertion of user-specified images; may have different arrays of graphic elements, such as borders; and/or may have different recommended sizes. It will be appreciated that other differences may exist between various templates. Representations of the templates 176 may be presented to aid the user in selection and/or the selection process may be menu-driven, with the various templates available being grouped by theme, for example. It will be appreciated that the template selection interface 180*a* may involve multiple pages 173 and/or may involve multiple hierarchical levels of menus, and may involve separate operations such as preliminary selection of a template, display of representation of the template, and confirmation of the selection. The template selection interface 180*a* may include a representation of the template 176 to be populated and/or may include one or more applets.

Following selection of the template 176 via the template selection interface 180*a*, in block 309 the page 173 containing the template population interface 180b (FIG. 1) is downloaded from the publishing server 103 to the client 109 and is displayed on the display 149. The template population interface 180b allows the user of the client 109 to utilize input devices such as the keyboard 156 (FIG. 1) and the mouse 159 (FIG. 1) to indicate image files that are to be integrated into corresponding copy holes or spaces in the selected template 176. The image files may be the image files 179 (FIG. 1) located on the publishing server 103, the image files 193 (FIG. 1) located on the image server 106 (FIG. 1), and/or the image files 212 (FIG. 1) located on the client 109.

Once the user of the client 109 has populated the template 176 to achieve a satisfactory layout for the poster, image data is uploaded from the client 109 to the publishing server 103 in block 312, for further processing into a printable preview image and an image for the poster. The image data may be the image files themselves, locators corresponding to a location from which the image files may be retrieved, or a combination of the two. For example, the image data may be one or more of the image files 212 which are stored on the memory 136 (FIG. 1) of the client 109. Alternatively, the image data may be locators, for example uniform resource locators (URLs), corresponding to image files at other locations, for example the image files 179 on the memory 116 (FIG. 1) of the publishing server 103, and/or the image files 193 on the memory 126 (FIG. 1) of the image server 106. The image data may be part of a populated template, that is, the template 176 with image data included therewith or incorporated in. The populated template may be embodied in and transmitted as a markup language file.

If necessary, in block 315 the publishing server 103 retrieves the image files corresponding to the locators and makes the image files available in the memory 116.

In block 318 the image files for populating the template 176 may be checked for compatibility. Such checking for compatibility is broadly defined as checking for the suitability of the image files for use with the poster generation system 100 to produce a quality poster. The checking may involve checking the format of the image files to determine if they are of a type that may be read by the image generator 166. Thus, the file type of the image files may include comparing the file type of an image file with a list of file types that may be utilized by the publishing server 103 in generating the poster. Alternatively or in addition, the checking in block 318 may include checking the resolution of the images in the image files, for example checking to see that the resolution meets or exceeds a predetermined minimum resolution threshold. The minimum resolution threshold may be selected to avoid graininess in the image of the poster. The minimum resolution threshold may be set in light of possible rescaling of the images by the user. As an example, the minimum resolution threshold may be 150 dots per inch (dpi), although it will be appreciated that other minimum resolution thresholds may be employed. The predetermined minimum resolution threshold may be a set constant value or may be based on the amount of magnification to be used in integrating the image into the template 176 to generate the poster. Thus, the checking may avoid poor quality poster images that may result from excessive magnification of images with insufficient resolution.

As another alternative, the checking in the block 318 may include checking to determine if the images correspond in size and/or shape to the corresponding copy holes in the template 176. The selection of a section of the image to be used in cropping or padding may be made automatically by the image generator 166 or may be made by the user of the client 109. The checking may trigger an interactive process with the client 109, for example requesting that alternative image files of higher resolution or different format be designated or requiring the user of client 109 to ratify use of low resolution image files previously designated.

A further alternative for the checking of block 318 is checking for degree of image compression. Image compression may involve loss of data, such that an enlargement of the image may introduce various image defects, such as moire effects, thereby, rendering the image quality unacceptable. Thus, the checking in block 318 may include warning the user if the degree of image compression is such as to potentially introduce image defects. The user may then use an image preview print to determine if poster image quality meets expectations.

It will be appreciated that some or all of the checking may alternatively take place at another point in the process, for example during or after the image manipulation described below with regard to block 323.

Thereafter, in block 321, the image manipulation/ selection interface 180c (FIG. 1) is sent from the publishing server 103 to the client 109, via the network 112. As discussed in greater detail below, the image manipulation/ selection interface 180c may be configured to allow the user of the client 109 to manipulate the images within the template, and/or to select a part of the poster for generation of a preview image. Manipulation of the images within the template may include such processes as translating the images, rotating the images, changing magnification of the images (re-scaling) and/or cropping the images. The manipulation may be accomplished in any of a number of suitable ways, for example by using the mouse 159 to click on and/or to drag the images. Information regarding manipulation of the images, such as information regarding location of the images relative to the template, may be sent from the client 109 to the publishing server 103, in block 323. The information may be in any of a variety of suitable forms, for example being represented in a six-component matrix, such as in the six-component matrix form that is used in PostScript language.

The preview image may be generated by the image generator 166 of the publishing server 103, in block 324, and may be downloaded to the client 109. The preview image may be an image at substantially the same magnification or resolution as the poster to be generated. For example, as explained in greater detail below, the mouse 159 or another input device may be used to move a wire frame over a representation of the template 176 which appears on the display 149 as part of the image manipulation/selection interface 180c, allowing the user of the client 109 to select a part of the ultimate poster for printing as a preview image. The wire frame may correspond to the size, relative to the poster size, of a piece of media upon which the preview image is to be printed.

After generation of the preview image in block 324, the preview or preview image is sent from the publishing server 103 to the client 109, in block 327. The preview image may be sent, for example, as part of a page 173. It will be appreciated that, alternatively, the preview image may be sent by the network 112 in another type of file, for example, as part of an electronic mail message. The preview image may be printed out using the printer 153 that is coupled to the client 109. The preview image file may include a command for the printer 153 to print out the preview image at its highest resolution setting. By printing the preview image, the user of the client 109 can make a determination regarding the acceptability of the resolution of the image files when they are enlarged to fit into the template 176. Often, an image that looks fine on a small screen will be unacceptably grainy when magnified for use on a poster. Allowing the printing of a preview image enables such a problem to be detected and rectified without the need for the cost and delay involved in fully printing an ultimately unacceptable poster. Moreover, allowing the user of the client 109 to select the portion of the poster for which the printable preview image is generated enables the user to focus on one or more specific areas that are thought to be potential problem regions in the populated template poster design. For example, the user may be concerned about the appearance of a specific image or part of an image, corresponding to a particular image file. If a problem is found in the printing of the preview image, it will be appreciated that the problem may be rectified in any of a number of ways. For example, other images with higher resolution may be substituted. Alternatively, magnification of the images may be reduced. As another example, a different size may be selected for the final poster. Yet another example would be use of a different of the templates 176, for example utilizing a template with smaller copy holes for insertion of images.

Following the generation of the printable preview image, in block 330 a print image is generated. The print image is generated by the image generator 166, using the same information that is used to generate the printable preview image. It will be appreciated that the print image may be generated at the same time as the printable preview image. Alternatively, the image generator 166 may be configured to generate the print image only after an indication by the user of the client 109, that the preview image is acceptable. The print image may be embodied in a printer control language file, or in a format designed to accurately describe page content, such as PostScript or PDF or other commonly used page description formats.

Finally, in block 333 the print image is sent to a printer, such as the printer 120 (FIG. 1), for printing of the final poster. It will be appreciated that the printer for printing the final poster may be directly coupled to the publishing server 103, as is illustrated in FIG. 1. Alternatively, the printer for printing the poster may be in another location from the publishing server 103, for example being coupled to the publishing server 103 via the network 112. As a further alternative, the printer may be a non-networked remote printer, with data regarding the print image being sent to the non-network printer by any of a variety of suitable means.

Figure 3:
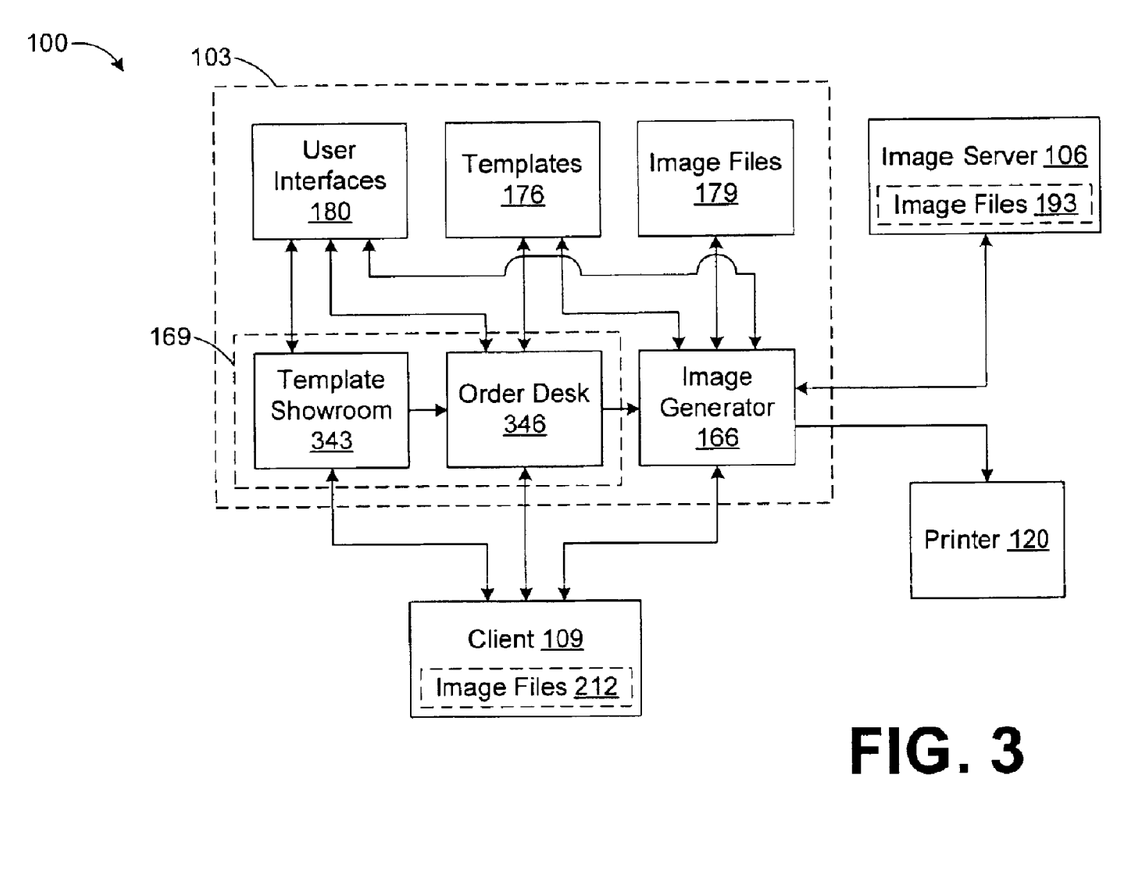
FIG. 3 is a conceptual block diagram illustrating information flow in the functionality of FIG. 2.

FIG. 3 is a functional block diagram, including the image generator 166 and the server logic 169, according to an embodiment of the present invention. The blocks of the image generator 166 and the server logic 169 each represent a module, object, or other grouping or encapsulation of underlying functionality as implemented in programming code. However, the same underlying functionality may exist in one or more modules, objects, or other groupings or encapsulations that differ from those shown in FIG. 3 without departing from the present invention as defined by the appended claims.

A template showroom 343, which may be a part of the server logic 169, accesses the template selection interface 180*a* (FIG. 1) of the user interfaces 180, and interacts with the client 109 in the template selection process described above with respect to blocks 303 and 306 (FIG. 2). The template showroom 343 then forwards information, such as the template 176 selected, to an order desk 346, which also may be part of the server logic 169. The order desk 346 accesses the templates 176 for information regarding the selected template. Then the order desk 346 accesses the template population interface 180*b* (FIG. 1), and engages with the client 109 in the template population process described above with regard to blocks 309 and 312 (FIG. 2). Image data uploaded by the client 109 may then be forwarded to an image generator 166. The image generator 166 performs the processes described above in blocks 315–330 (FIG. 2). In doing so, the image generator may access the templates 176 and the image files 179, as well as possibly the image files 193 on the remote image server 106. In addition, the image generator 166 may interact with the client 109 via the image manipulation/selection interface 180*c* (FIG. 1). Following generation of the print image by the image generator 166 in block 330, the print image is sent to the printer 120 for printing of the poster, as described above with regard to block 333 (FIG. 2).

It will be appreciated that FIG. 3 is merely a conceptual block diagram, and that the parts of the publishing server 103 shown in FIG. 3 may or may not correspond to actual structures, items, or programming objects in the publishing server 103.

Figure 4:
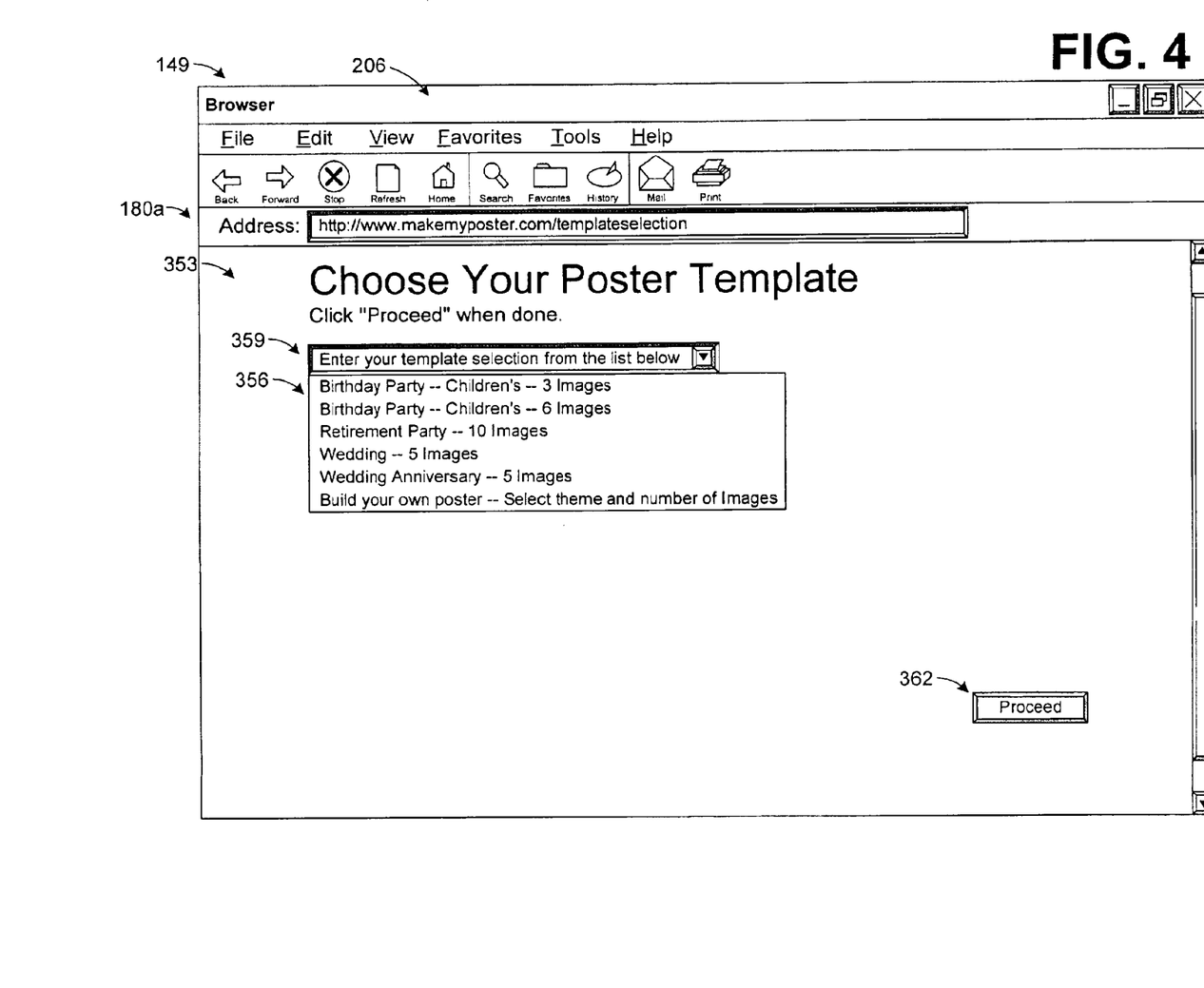
FIG. 4 is a screen shot representation of the template selection interface of FIG. 1.

FIG. 4 shows an example template selection interface 180*a* (FIG. 1), displayed on the display 149 (FIG. 1) that is coupled to the client 109 (FIG. 1). As noted above, the template selection interface 180*a* may be part of a page 173 (FIG. 1), which is displayed using the browser 206 (FIG. 1). The template selection interface 180*a* includes a graphical user interface (GUI) 353 having a pull-down menu 356 that allows a user of the client 109 to make a selection from the available template choices of the poster templates 176 (FIG. 1). The entries in pull-down menu 356 may include information regarding the templates 176, such as the theme or subject matter of the template, the number of copy holes of images in the template, and/or the size and/or aspect ratio of the poster to be produced with the template. Selection from the pull-down menu 356 may cause text to appear in a field 359 associated with the pull-down menu 356. For example, the text of the pull-down menu entries may be placed in the field 359. The GUI 353 may include a button 362, actuation of which indicates a final selection of the template 176. Actuation of the button 362 may send a message to the publishing server 103 indicating the template 176 selected and causing the page 173 containing the template population interface 180*b* to be sent. The message indicating the template 176 selected may be a message in markup language, such as a template selection markup language file.

It will be appreciated that many alternatives may be substituted for the specific aspects of the template selection interface 180*a* discussed above. For example, many well-known suitable devices are known for display of a number of possible templates and selection of one of the templates. The templates 176 may be displayed as a series of hyperlinks, for example, with information regarding the templates, such as a thumbnail image, displayed in proximity to the text. The list may be hierarchically organized into a series of lists, menus, or pages. For example, the user may first make a choice by subject matter and then be presented with a series of templates 176 with that subject matter. Numerous other well-known variants will be appreciated.

Figure 5:
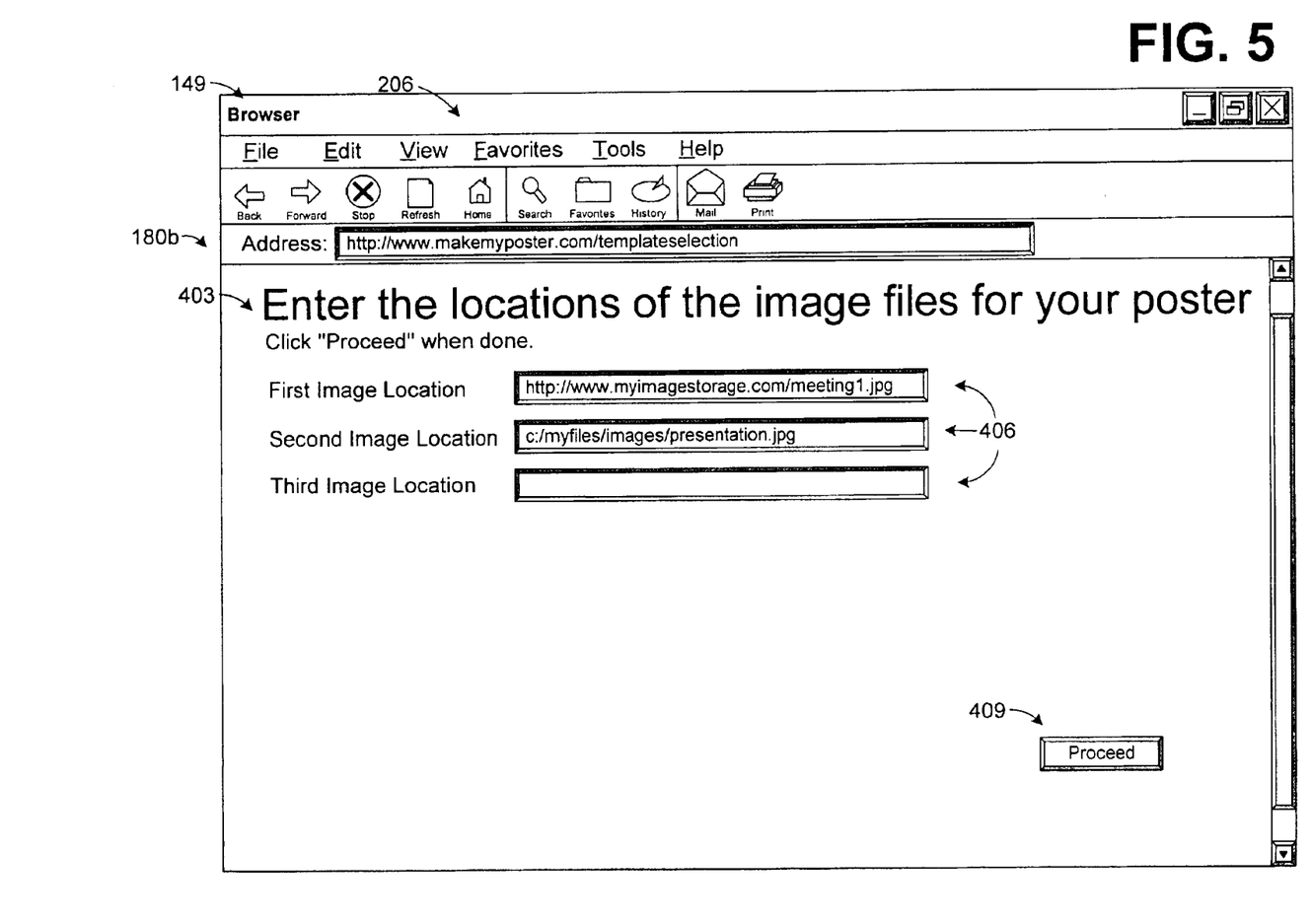
FIG. 5 is a screen shot representation of the template population interface of FIG. 1.

FIG. 5 shows the template population interface 180*b* (FIG. 1) displayed on the display 149 (FIG. 1) that is coupled to the client 109 (FIG. 1). As noted above, the template population interface 180*b* may be part of a page 173 (FIG. 1), which is displayed using the browser 206 (FIG. 1). The template population interface 180*b* includes a graphical user interface (GUI) 403 having fields 406 corresponding to spaces or copy holes in the selected template 176 that are to be populated with images. The fields 406 may be configured to allow the user of the client 109 to enter text regarding the location of the image file to be placed in the corresponding copy hole in the template 176. The text may be text such as that of any of the locators described earlier. Thus, the text may be a path corresponding to the location of an image file 212 (FIG. 1) on the client 109. Alternatively, the text may be a URL or other locator corresponding to a remotely located image file, for example, the image files 179 (FIG. 1) on the publishing server 103 (FIG. 1) or the image files 193 (FIG. 1) on the image server 106 (FIG. 1).

It will be appreciated that a mouse or other pointing device may be used to actuate a text-entering function for the fields 406. However, many other suitable methods of data entry and/or file selection may be utilized. For example, keyboard commands may be used to navigate between the fields 406 and to enter data into the fields 406. Further, many well-known alternatives exist to using fields. For example, pull-down menus may be utilized. As another example, the template population interface 180b may be configured to utilize a browsing function, for example, allowing the user of the client 109 to browse the image files 212 located on the client 109 and/or to browse the image files 179 or 193 located on remote servers. It will be appreciated that that many other suitable methods of selecting and entering information regarding image files may be utilized. As another example, choices from pull-down menus on a menu bar may be utilized in entering such information. A button 409 may be actuated to indicate that the population is complete. The image data may be communicated from the client 109 to the publishing server 103 as part of a template population markup language file.

It will be appreciated that embodiment of the template population interface 180b shown in FIG. 5 and described above is only an example of the range of possible template selection interfaces that may suitably be employed. As one example of an alternative, it will be appreciated that the template population interface 180b may be a what-you-see-is-what-you-get (WYSIWYG) interface that displays a representation of all or part of the poster template 176 and may be updated by placement of images corresponding to tentatively selected image files in the representation. Such an alternative template population interface 180b may be configured such that the template representation is updated whenever new data is inserted (or deleted) via the fields, pull-down menus, or other data entry devices.

Alternatively, it will be appreciated that any of a variety of suitable devices may be provided for a user-initiated update of the template representation. For example, a WYSIWYG template population interface 180b may include a button in its GUI 403, the actuation of which causes the view of the template representation to be updated with the images and graphical elements indicated in the fields and pull-down menus. Updating the representation may involve retrieving full or thumbnail versions of the images, and locating them in the corresponding copy holes in the interface 176. The retrieval of images may include downloading of images from remote locations, such as the downloading of one or more of the image files 179 from the publishing server 103, and/or downloading of one or more of the image files 193 from the image server 106.

It will be further appreciated that the template population interface 180b may be suitably configured to allow population of the template by text and/or graphics, as opposed to population only by images. Text may be placed in a particular copy hole designated for text, such as a title block. Many suitable methods for selecting or entering text and/or graphics may be employed. Provisions may be made for overlaying text on images, with, for example, text in the foreground and images in the background. Further, it will be appreciated that the template population interface 180b may be configured to allow multiple images to be placed in a single copy hole, with the images perhaps partially overlaid one on another.

Figure 6:
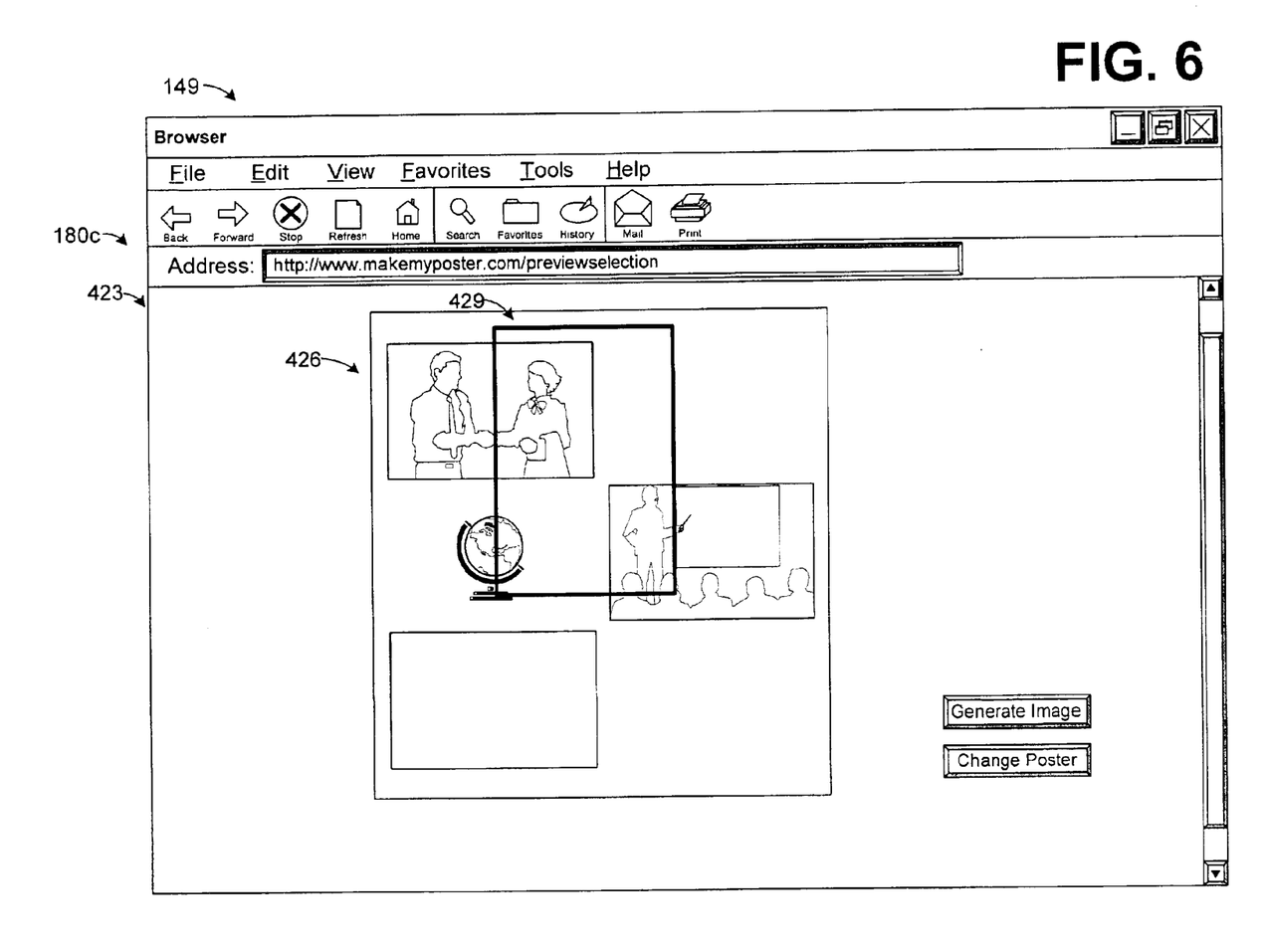
FIG. 6 is a screen shot representation of the preview image selection interface of FIG. 1.

Turning now to FIG. 6, as noted above, the images corresponding to the image files 179 may be manipulated, and/or a preview image may be selected, using the image manipulation/selection interface 180c (FIG. 1). The image manipulation/selection interface 180c may be downloaded to the client (FIG. 1) from the publishing server 103 (FIG. 1) and displayed on the display 149 (FIG. 1) for use with the browser 206 (FIG. 1). The image manipulation/selection interface 180c includes a graphical user interface (GUI) 423 for allowing the user of the client 109 (FIG. 1) to manipulate the images within the poster and/or to select a preview image.

A poster representation 426 is displayed as part of the GUI 423. The poster representation 426 may be a representation of the template 176, such as a lower-resolution representation, populated by images and/or graphics. The template 176 may be populated by the previously-selected image files included in or corresponding to the image data, to generate the poster representation 426. It will be appreciated that lower resolution versions of the images, such as thumbnail images, may be used to populate the template 176 for generation of the poster representation 426.

The GUI 423 is configured to allow manipulation of the images from image files 179, to change the appearance of the images within the template 176. Such manipulation may take the form of translating images, rotating images, changing magnification of images (re-scaling), and/or cropping images, for example. Manipulation may be accomplished, for example, by dragging a portion of the poster representation 426 that corresponds to an image, thereby translating the image relative to the template 176. An image that is larger than the copy hole in the template may effectively be cropped thereby, with parts of the image hidden by the template 176, which may overlap the images of the image files. Alternatively, the user-selected manipulation may include cropping the image files to fit the copy holes or to otherwise prevent images from undesirably overlapping all or part of other items in the template.

As another example, the GUI 423 may be configured to allow magnification of the image by clicking on the portion of the poster representation 426 that corresponds to the image. The magnification may result in the image being effectively cropped, in that parts of the image appearing outside the copy hole being hidden by the template 176.

It will be appreciated that manipulation of images may cause portions of two or more images to appear in the same copy hole. For example, an image may be magnified and/or translated such that a portion of that image overlaps another image in an adjacent copy hole. Questions as to which image to display in front for a given copy hole may be resolved, for example, by clicking on one of the multiple images in the same copy hole.

It will be appreciated that a variety of suitable commands, for example involving keyboard commands, mouse movements and/or clicks, and/or menu-driven commands, may be used to manipulate the images relative to the template 176 and specifically relative to the corresponding copy hole of the template 176. The manipulations may be recorded and stored in the client 109 and may be forwarded to the publishing server 103. The manipulations may be recorded in any number of suitable conventional ways, for example being numerically recorded as a series of numbers, corresponding for example to translations of an image in each of the directions of the page, magnifications of the image in each of multiple directions, and rotation of the image. The GUI 423 may be configured to transmit the image manipulation information, if any, from the client 109 to the publishing server 103 automatically when the image manipulation/selection interface 180c is exited.

Suitable alternatives of the image manipulation/selection interface 180c may be employed to allow the full range of alternatives discussed above with regard to the template population interface 180b. For example, the image manipulation/selection interface 180c may allow movement and rescaling of text in a copy hole.

The GUI 423 may also be configured to allow the user of the client 109 to select all or part of the poster representation 426 for generation of one or more corresponding preview images. For example, the GUI 423 may be configured such that the user of the client 109 is able to position a wire frame 429 corresponding to a printed page of a preview image to a desired location within the poster representation 426. The wire frame 429 may correspond to the size of a portion of the poster that would fit on a standard size piece of media, such as a piece of A4 paper or 8½ by 11 inch paper. The preview image may be such that features on the printed preview image directly correspond in size and/or resolution with corresponding features of the final poster. Thus, the preview image may give the user as clear a preview as possible of what the final poster will look like, given the constraints of printer performance and available printer page size. Toward, that end, the preview image sent to the client 109 may include a command for the printer 153 to print the preview image at the highest resolution of the printer 153.

As an alternative, the image manipulation/selection interface 180c may be configured to allow changes in the size and/or orientation of the wire frame 429. Thus, the image manipulation/selection interface 180c may be part of a page 173 that includes a suitable applet. In addition, the user of the client 109 may be able to request multiple preview images, for example, a set of images allowing preview printing of the entire poster in multiple pages. The request for the preview image may be uploaded from the client 109 to the publishing server 103 via the network 112 (FIG. 1) through any of a variety of suitable devices, for example, as a preview image markup language text file or as an electronic mail message.

As a further alternative, it will be appreciated that the image manipulation and the preview image selection may be accomplished on different interfaces, rather than being combined in the same interface.

It will be appreciated that the system and process described above may be varied in a variety of suitable ways. For example, the system and method described above have been described in terms of generating a poster, which was broadly defined above as a document larger in size than a standard-sized piece of media (letter, legal, or A4). It will be appreciated that the system and method may be utilized in generating other sorts of documents.

Although the image generator 166 (FIG. 1) and the server logic 169 (FIG. 1) are embodied in software or code executed by general purpose hardware as discussed above, as an alternative the image generator 166 and server logic 169 may be embodied in whole or in part in dedicated hardware or a combination of software/general purpose hardware and dedicated hardware. If embodied in dedicated hardware, the image generator 166 and server logic 169 may be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flowchart of FIG. 2 shows the architecture, functionality, and operation of an implementation of the image generator 166 and server logic 169 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the flowcharts of FIG. 2 are relatively self-explanatory and are understood by those with ordinary skill in the art to the extent that software and/or hardware can be created by one with ordinary skill in the art to carry out the various logical functions as described herein.

Also, where the image generator 166 and server logic 169 (FIG. 1) include software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the image generator 166 and server logic 169 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of generating a poster in a computer system, comprising:
   providing a template selection interface enabling a user of a client computer to select a template from a plurality of template choices, wherein the client computer accesses the interface via a network, and wherein the template includes an image-receiving copy hole;
   providing a template population interface enabling the user to associate an image file with the image-receiving copy hole;
   providing an image manipulation interface enabling the user to manipulate an image corresponding to the image file, within the copy hole, by interaction between the client computer and the computer system; and
   checking the image file for compatibility, wherein the checking includes determining whether the image file has a resolution that satisfies a predetermined resolution threshold.

2. The method of claim 1, wherein the checking includes checking a degree of image compression.

3. The method according to claim 1, wherein the resolution threshold is established as a function of an amount of magnification used to integrate the image file into the template.

4. The method according to claim 1, wherein the checking includes determining whether the image file has at least one of a size and a shape compatible with the copy hole.

5. The method according to claim 1, wherein the checking includes checking a file format of the image file.

6. A poster generation computer program embodied in a computer readable medium, comprising:
   code that provides a template selection interface enabling a user of a client computer to select a template from a plurality of template choices, wherein the client computer accesses the interface via a network, and wherein the template includes an image-receiving copy hole;
   code that provides a template population interface enabling the user to associate an image file with the image-receiving copy hole;
   code that provides an image manipulation interface enabling the user to manipulate an image corresponding to the image file, within the copy hole, by interaction between the client computer and the computer system; and
   code that checks the image file for compatibility, wherein the code that checks the image file for compatibility determines whether the image file has a resolution that satisfies a predetermined resolution threshold.

7. The computer program of claim 6, wherein the code that provides the image manipulation interface includes code that enables the user to translate the image within the copy hole.

8. The computer program of claim 6, wherein the code that provides the image manipulation interface includes code that enables the user to re-scale the image within the copy hole.

9. The computer program of claim 6, wherein the code that provides the image manipulation interface includes code that enables the user to rotate the image within the copy hole.

10. The computer program of claim 6, further comprising:
    code that generates a preview image from the template and the image file; and
    code that sends the preview image to the client computer.

11. The computer program of claim 10, further comprising:
    code that generates a print image of the poster from the template and the image file, and
    code that sends the print image to a printer.

12. The computer program of claim 6, wherein the code that provides the template population interface includes code that provides an interface that enables the user to upload the image files from the client to the computer system.

13. The computer program of claim 6, wherein the code that checks the image file for compatibility checks at least one of a degree of image compression of the image file, whether the image file has at least one of a size and a shape compatible with the copy hole, and a file format of the image file.

14. A poster generation computer system comprising:
    a processor coupled to a local interface;
    a memory coupled to a local interface; and
    processing logic stored on the memory and executable by the processor including:
       logic that provides a template selection interface enabling a user of a client computer to select a template from a plurality of template choices, wherein the client computer accesses the interface via a network, and wherein the template includes an image-receiving copy hole;
       logic that provides a template population interface enabling the user to associate an image file with the image-receiving copy hole;
       logic that provides an image manipulation interface enabling the user to manipulate an image corresponding to the image file, within the copy hole, by interaction between the client computer and the computer system; and
       logic that checks the image file for compatibility, wherein the logic that checks the image file for compatibility determines whether the image file has a resolution that satisfies a predetermined resolution threshold.

15. The system of claim 14, wherein the logic that provides the image manipulation interface includes logic that enables the user to translate the image within the copy hole.

16. The system of claim 14, wherein the logic that provides the image manipulation interface includes logic that enables the user to re-scale the image within the copy hole.

17. The system of claim 14, wherein the logic that provides the image manipulation interface includes logic that enables the user to rotate the image within the copy hole.

18. The system of claim 14, further comprising:

logic that generates a preview image from the template and the image file; and logic that sends the preview image to the client computer.

19. The system of claim 18, further comprising:

logic that generates a print image of the poster from the template and the image file, and logic that sends the print image to a printer.

20. The system of claim 14, wherein the logic that checks the image file for compatibility checks at least one of a degree of image compression of the image file, whether the image file has at least one of a size and a shape compatible with the copy hole, and a file format of the image file.

21. A poster generation computer system comprising:

means for providing a template selection interface enabling a user of a client computer to select a template from a plurality of template choices, wherein the client computer accesses the interface via a network, and wherein the template includes an image-receiving copy hole;

means for providing a template population interface enabling the user to associate an image file with the image-receiving copy hole;

means for providing an image manipulation interface enabling the user to manipulate an image corresponding to the image file, within the copy hole, by interaction between the client computer and the computer system; and means for checking the image file for compatibility, wherein the means for checking determines whether the image file has a resolution that satisfies a predetermined resolution threshold.

* * * * *